April 29, 1947.  A. WARMISHAM ET AL  2,419,804
OPTICAL OBJECTIVE
Filed July 2, 1943
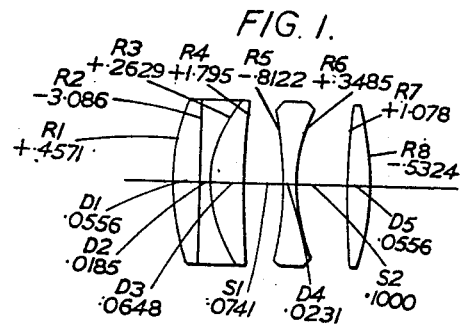
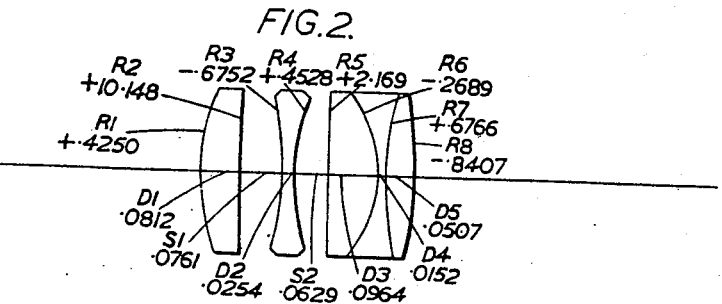
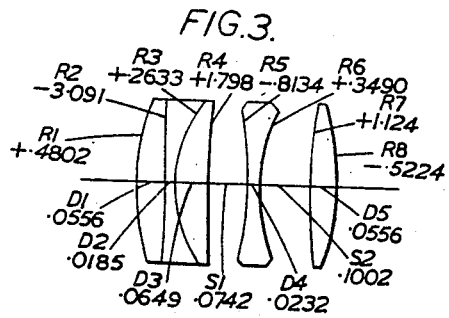
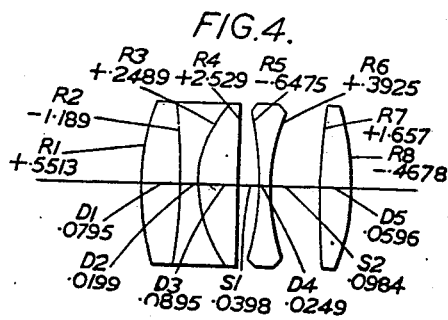
Inventors
A. WARMISHAM &
By C.G. WYNNE
Attorneys Patented Apr. 29, 1947

2,419,804

UNITED STATES PATENT OFFICE 2,419,804

OPTICAL OBJECTIVE

Arthur Warmisham and Charles Gorrie Wynne,
Leicester, England

Application July 2, 1943, Serial No. 493,275
In Great Britain August 26, 1942

24 Claims. (Cl. 88—57)

This invention relates to optical objectives for photographic or like purposes, comprising two or more divergent elements and two or more convergent elements, and corrected for spherical and chromatic aberrations, coma, astigmatism, curvature of field and distortion, and having small zonal spherical aberration.

It is well-known to provide paraxial chromatic correction in a doublet in respect of two colours, for example red and green, by the use of an appropriate combination of crown and flint glass, but owing to the different relative partial dispersions of the two kinds of glass the correction does not extend throughout the spectrum, and there is a residual colour aberration known as secondary spectrum. Reasonably good correction can be obtained in the well-known triplet objective, which however does not provide correction for field curvature or astigmatism.

The present invention has for its object to provide good correction for secondary spectrum in a photographic or like objective having small zonal spherical aberration without sacrificing correction for astigmatism, field curvature and distortion.

The necessary conditions can be expressed mathematically as follows. If $f_p$ and $m_p$ are respectively the focal length and the magnification of a lens element $p$ having refractive indices $n_C$, $n_D$, $n_e$, $n_F$, $n_g$, respectively for the lines CDeFg Abbé V number $$V_p\left(=\frac{n_D-1}{n_F-n_C}\right)$$

and relative partial dispersion $$\theta_p\left(=\frac{n_t-n_e}{n_F-n_C}\right)$$

then good secondary spectrum correction is obtained if $$\sum \frac{m_p^2}{f_p} \cdot \frac{1}{V_p} = 0$$

and $$\sum \frac{m_p^2}{f_p} \cdot \frac{\theta_p}{V_p} = 0$$

for all the elements of the objective. It should should be made clear that the magnification $m_p$, herein referred to, may be defined as being equal to the ratio $h_p/h_1$, where $h_p$ and $h_1$ are respectively the ordinates of the points of intersection with the lens element $p$ and with the first lens element of a paraxial ray of the wave-length of the D-line through the conjugate points for which the objective is corrected.

In the objective according to the present invention one of the divergent elements is made of a crystalline alum and is cemented between two convergent elements of optical glass.

The crystalline alum may be of the double sulphate class, and preferably incorporates aluminium sulphate combined with an alkaline sulphate as represented by the general formula $R_2SO_4 \cdot Al_2(SO_4)_3 \cdot 24H_2O$, wherein R represents a monovalent metal or a monovalent radicle, for example potassium or sodium or ammonium.

The two convergent elements cemented to the alum crystal element are preferably made of glasses whose mean refractive indices differ from that of the crystal by more than .1 and less than .25, whilst the Abbé V numbers of the glasses used for all the convergent elements lie between 45 and 62. Dense flint glass is preferably used for one of the divergent elements.

The objective may be arranged in various ways, but conveniently has either its front component or its rear component convergent and of cemented triplet construction including the crystalline alum element as its middle element. Thus the objective may consist of a simple divergent component located between two convergent components, of which one is simple and the other is of cemented triplet construction. In such objective dense flint glass is preferably used for the simple divergent middle component.

In the accompanying drawings

Figure 1 illustrates an objective according to the invention having three components of which the front component is a convergent triplet including a potash alum element and the second and third components are simple and are respectively divergent and convergent, Figure 2 shows an objective differing from that of Figure 1 in that the rear component is the triplet containing the potash alum element, the front component being simple, and Figures 3 and 4 respectively show objectives similar to that of Figure 1 but using sodium alum and ammonium alum instead of potash alum.

Numerical data for these four examples are given in the following tables, in which $R_1$, $R_2$ ... represent the radii of curvature of the individual lens surfaces counting from the front (that is the side of the longer conjugate), the positive sign indicating that the surface is convex to the front and the negative sign that it is concave thereto, $D_1$, $D_2$ ... represent the axial thicknesses of the individual lens elements, and $S_1$, $S_2$ represent the axial lengths of the airgaps between the components. The tables also give the mean refractive indices $n_D$ for the D-line, the Abbé V numbers and the relative partial dispersions $\theta$ for the intervals ($e$ to $g$)/($C$ to $F$) of the glasses or crystals used for the individual elements.

*Example I*

| Equivalent focal length 1.000 | | Relative Aperture F/2.7 | | |
|---|---|---|---|---|
| Radius | Thickness or Air Separation | Refractive Index $n_D$ | Abbé V number | Relative Partial Dispersion |
| $R_1+.4571$ | | | | |
| | $D_1$ .0556 | 1.613 | 59.3 | .999 |
| $R_2-3.086$ | | | | |
| | $D_2$ .0185 | 1.456 | 58.1 | .928 |
| $R_3+.2629$ | | | | |
| | $D_3$ .0648 | 1.613 | 59.3 | .999 |
| $R_4+1.795$ | | | | |
| | $S_1$ .0741 | | | |
| $R_5-.8122$ | | | | |
| | $D_4$ .0231 | 1.652 | 33.5 | 1.060 |
| $R_6+.3485$ | | | | |
| | $S_2$ .1000 | | | |
| $R_7+1.078$ | | | | |
| | $D_5$ .0556 | 1.613 | 59.3 | .999 |
| $R_8-.5324$ | | | | |

*Example II*

| Equivalent focal length 1.000 | | Relative Aperture F/2.7 | | |
|---|---|---|---|---|
| Radius | Thickness or Air Separation | Refractive Index $n_D$ | Abbé V number | Relative Partial Dispersion |
| $R_1+.4250$ | | | | |
| | $D_1$ .0812 | 1.644 | 48.3 | 1.025 |
| $R_2+10.148$ | | | | |
| | $S_1$ .0761 | | | |
| $R_3-.6752$ | | | | |
| | $D_2$ .0254 | 1.697 | 30.5 | 1.067 |
| $R_4+.4528$ | | | | |
| | $S_2$ .0629 | | | |
| $R_5+2.169$ | | | | |
| | $D_3$ .0964 | 1.613 | 59.3 | .999 |
| $R_6-.2689$ | | | | |
| | $D_4$ .0152 | 1.456 | 58.1 | .928 |
| $R_7+.6766$ | | | | |
| | $D_5$ .0507 | 1.644 | 48.3 | 1.025 |
| $R_8-.8407$ | | | | |

These two examples both use potash alum crystal for the divergent middle element of the triplet component cemented between two convergent elements of optical glass, and they differ from one another primarily in that in Example I it is the convergent front component and in Example II it is the convergent rear component, which is of triplet construction. Both examples employ dense flint glass for the simple divergent middle component, and in Example I the three convergent elements are all made of the same crown glass, whilst in Example II crown glass is used for one of the convergent elements and dense barium flint glass for the other two.

*Example III*

| Equivalent focal length 1.000 | | Relative Aperture F/2.9 | | |
|---|---|---|---|---|
| Radius | Thickness or Air Separation | Refractive Index $n_D$ | Abbé V number | Relative Partial Dispersion |
| $R_1+.4802$ | | | | |
| | $D_1$ .0556 | 1.613 | 59.3 | .999 |
| $R_2-3.091$ | | | | |
| | $D_2$ .0185 | 1.4388 | 57.8 | .909 |
| $R_3+.2633$ | | | | |
| | $D_3$ .0649 | 1.613 | 57.6 | 1.005 |
| $R_4+1.798$ | | | | |
| | $S_1$ .0742 | | | |
| $R_5-.8134$ | | | | |
| | $D_4$ .0232 | 1.652 | 33.5 | 1.060 |
| $R_6+.3490$ | | | | |
| | $S_2$ .1002 | | | |
| $R_7+1.124$ | | | | |
| | $D_5$ .0556 | 1.613 | 55.7 | 1.010 |
| $R_8-.5224$ | | | | |

*Example IV*

| Equivalent focal length 1.000 | | Relative Aperture F/2.8 | | |
|---|---|---|---|---|
| Radius | Thickness or Air Separation | Refractive Index $n_D$ | Abbé V number | Relative Partial Dispersion |
| $R_1+.5513$ | | | | |
| | $D_1$ .0795 | 1.613 | 59.3 | .999 |
| $R_2-1.189$ | | | | |
| | $D_2$ .0199 | 1.4594 | 58.3 | .938 |
| $R_3+.2489$ | | | | |
| | $D_3$ .0895 | 1.613 | 59.3 | .999 |
| $R_4+2.529$ | | | | |
| | $S_1$ .0398 | | | |
| $R_5-.6475$ | | | | |
| | $D_4$ .0249 | 1.621 | 36.1 | 1.052 |
| $R_6+.3925$ | | | | |
| | $S_2$ .0984 | | | |
| $R_7+1.657$ | | | | |
| | $D_5$ .0596 | 1.613 | 57.6 | 1.005 |
| $R_8-.4678$ | | | | |

These two examples are both generally similar to Example I but use in Example III sodium alum and in Example IV ammonium alum in place of the potash alum. They each use dense flint glass for the simple divergent middle component and crown glass for the three convergent elements.

It will be appreciated that the above arrangements have been described by way of example only and that the invention may be carried into practice in other ways.

What we claim as our invention and desire to secure by Letters Patent is:

1. An optical objective, corrected for spherical and chromatic aberrations, coma, astigatism, field curvature and distortion, and comprising three components in axial alignment of which the front and rear components are convergent and the middle component divergent, one of the convergent components being of cemented triplet construction having a focal length between .5 and .7 times the focal length of the complete objective, such triplet component consisting of a double-concave divergent middle element made of crystalline alum of the double sulphate class having the formula $R_2SO_4.Al_2(SO_4)_3$ with water of crystallization, wherein R represents a monovalent metal or monovalent radical, and two convergent elements of optical glass between which said middle element is cemented, the algebraic sum of the curvatures of the two cemented surfaces lying between 2 and 4 times the reciprocal of the focal length of the whole triplet component, one cemented surface having a radius of curvature more than twice that of the other cemented surface.

2. An optical objective corrected for spherical and chromatic aberrations, coma, astigatism, field curvature and distortion, and comprising three components in axial alignment of which the front and rear components are convergent and the middle component divergent, one of the convergent components being of cemented triplet construction having a focal length between .5 and .7 times the focal length of the complete objective, such triplet component consisting of a double-concave divergent element made of crystalline alum of the double sulphate class having the formula $R_2SO_4.Al_2(SO_4)_3$ with water of crystallization, wherein R represents a monovalent metal or monovalent radical, cemented between two convergent elements made of glasses whose mean refractive indices differ from that of the crystal element by more than .1 and less than .25 and whose Abbé V numbers lie between 45 and 62, the algebraic sum of the curvatures of the two cemented surfaces lying between 2 and 4 times the reciprocal of the focal length of the whole triplet component, one cemented surface having a radius of curvature more than twice that of the other cemented surface.

3. A triplet lens component, comprising a double-concave divergent middle element made of crystalline alum of the double sulphate class having the formula $R_2SO_4.Al_2(SO_4)_3$ with water of crystallzation, wherein R represents a monovalent metal or monovalent radical, and two convergent elements of optical glass between which said middle element is cemented, the algebraic sum of the curvatures of the two cemented surfaces lying between 2 and 4 times the reciprocal of the focal length of the whole triplet component, one cemented surface having a radius of curvature more than twice that of the other cemented surface.

4. A triplet lens component comprising a double concave middle element made of crystalline alum of the double sulphate class having the formula $R_2SO_4.Al_2(SO_4)_3$ with water of crystallization, wherein R represents a monovalent metal or monovalent radical, and two convergent elements between which the middle element is cemented, such convergent elements being made of glasses whose mean refractive indices differ from that of the crystal by more than .1 and less than .25 and whose Abbé V numbers lie between 45 and 62, the algebraic sum of the curvatures of the two cemented surfaces lying between 2 and 4 times the reciprocal of the focal length of the whole triplet component one cemented surface having a radius of curvature more than twice that of the other cemented surface.

5. An optical objective, corrected for spherical and chromatic abberations, coma, astigmatism, field curvature and distortion, and comprising three components in axial alignment, of which the front and rear components are convergent and the middle component divergent, the divergent component and one of the convergent components being simple and made of optical glass, whilst the other convergent component is in the form of a cemented triplet having a focal length between .5 and .7 times that of the complete objective, such triplet component consisting of a double-concave divergent middle element made of crystalline alum of the double sulphate class having the formula $R_2SO_4.Al_2(SO_4)_3$ with water of crystallization, wherein R represents a monovalent metal or monovalent radical, and two convergent elements of optical glass between which said middle element is cemented, the algebraic sum of the curvatures of the two cemented surfaces lying between 2 and 4 times the reciprocal of the focal length of the whole triplet component, one cemented surface having a radius of curvature more than twice that of the other cemented surface.

6. An optical objective, corrected for spherical and chromatic aberrations, coma, astigmatism, field curvature and distortions, and comprising a meniscus-shaped convergent front component of cemented triplet construction having its outer surfaces convex to the front and having a focal length between .5 and .7 times that of the complete objective, a convergent simple rear component made of glass having an Abbé V number between 45 and 62, and a divergent simple middle component made of dense flint glass, the triplet front component consisting of a double-concave divergent element made of crystalline alum of the double sulphate class having the formula $R_2SO_4.Al_2(SO_4)_3$ with water of crystallization, wherein R represents a monovalent metal or monovalent radical, cemented between two convergent elements made of glasses whose Abbé V numbers lie between 45 and 62 the algebraic sum of the curvatures of the two cemented surfaces lying between 2 and 4 times the reciprocal of the focal length of the whole triplet component, one cemented surface having a radius of curvature more than twice that of the other cemented surface.

7. An optical objective, corrected for spherical and chromatic aberrations, coma, astigmatism, field curvature and distortion, and comprising a double-convex convergent rear component of cemented triplet construction having a focal length between .5 and .7 times that of the complete objective, a convergent simple front component made of glass having an Abbé V number between 45 and 62, and a divergent simple middle component made of dense flint glass, the triplet rear component consisting of a double-concave divergent element made of crystalline alum of the double sulphate class having the formula $R_2SO_4.Al_2(SO_4)_3$ with water of crystallization, wherein R represents a monovalent metal or monovalent radical, cemented between two convergent elements made of glasses whose Abbé V numbers lie between 45 and 62, the algebraic sum of the curvatures of the two cemented surfaces lying between 2 and 4 times the reciprocal of the focal length of the whole triplet component one cemented surface having a radius of curvature more than twice that of the other cemented surface.

8. An optical objective as claimed in claim 1, in which the crystalline alum incorporates aluminium sulphate combined with an alkaline sulphate.

9. An optical objective as claimed in claim 2, in which the crystalline alum incorporates aluminium sulphate combined with an alkaline sulphate.

10. An optical objective as claimed in claim 6, in which the crystalline alum incorporates aluminium sulphate combined with an alkaline sulphate.

11. An optical objective as claimed in claim 7, in which the crystalline alum incorporates aluminium sulphate combined with an alkaline sulphate.

12. An optical objective as claimed in claim 1, in which the crystalline alum consists of potash alum.

13. A triplet lens component as claimed in claim 3, in which the crystalline alum consists of potash alum.

14. A triplet lens component as claimed in claim 4, in which the crystalline alum consists of potash alum.

15. An optical objective as claimed in claim 6, in which the crystalline alum consists of potash alum.

16. An optical objective as claimed in claim 7, in which the crystalline alum consists of potash alum.

17. An optical objective as claimed in claim 1, in which the crystalline alum consists of sodium alum.

18. A triplet lens component as claimed in claim 3, in which the crystalline alum consists of sodium alum.

19. A triplet lens component as claimed in claim 4, in which the crystalline alum consists of sodium alum.

20. An optical objective as claimed in claim 5, in which the crystalline alum consists of sodium alum.

21. An optical objective as claimed in claim 6, in which the crystalline alum consists of sodium alum.

22. An optical objective having numerical data substantially as set forth in the following table:

| Equivalent focal length 1.000 | | | Relative Aperture F/2.7 | |
|---|---|---|---|---|
| Radius | Thickness or Air Separation | Refractive Index $n_D$ | Abbé V number | Relative Partial Dispersion |
| $R_1+.4571$ | $D_1$ .0556 | 1.613 | 59.3 | .999 |
| $R_2-3.086$ | $D_2$ .0185 | 1.456 | 58.1 | .928 |
| $R_3+.2629$ | $D_3$ .0648 | 1.613 | 59.3 | .999 |
| $R_4+1.795$ | $S_1$ .0741 | | | |
| $R_5-.8122$ | $D_4$ .0231 | 1.652 | 33.5 | 1.060 |
| $R_6+.3485$ | $S_2$ .1000 | | | |
| $R_7+1.078$ | $D_5$ .0556 | 1.613 | 59.3 | .999 |
| $R_8-.5324$ | | | | |

In which $R_1$, $R_2$ ... represent the radii of curvature of the individual lens surfaces counting from the front (that is the side of the longer conjugate), the positive sign indicating that the surface is convex to the front and the negative sign that it is concave thereto, $D_1$, $D_2$ ... represent the axial thicknesses of the individual lens elements, and $S_1$, $S_2$ represent the axial lengths of the airgaps between the components.

23. An optical objective having numerical data substantially as set forth in the following table:

| Equivalent focal length 1.000 | | | Relative Aperture F/2.7 | |
|---|---|---|---|---|
| Radius | Thickness or Air Separation | Refractive Index $n_D$ | Abbé V number | Relative Partial Dispersion |
| $R_1+.4250$ | $D_1$ .0812 | 1.644 | 48.3 | 1.025 |
| $R_2+10.148$ | $S_1$ .0761 | | | |
| $R_3-.6752$ | $D_2$ .0254 | 1.697 | 30.5 | 1.067 |
| $R_4+.4528$ | $S_2$ .0629 | | | |
| $R_5+2.169$ | $D_3$ .0964 | 1.613 | 59.3 | .999 |
| $R_6-.2689$ | $D_4$ .0152 | 1.456 | 58.1 | .928 |
| $R_7+.6766$ | $D_5$ .0507 | 1.644 | 48.3 | 1.025 |
| $R_8-.8407$ | | | | |

In which $R_1$, $R_2$ ... represent the radii of curvature of the individual lens surfaces counting from the front (that is the side of the longer conjugate), the positive sign indicating that the surface is convex to the front and the negative sign that it is concave thereto, $D_1$, $D_2$ ... represent the axial thicknesses of the individual lens elements, and $S_1$, $S_2$ represent the axial lengths of the airgaps between the components.

24. An optical objective having numerical data substantially as set forth in the following table:

| Equivalent focal length 1.000 | | | Relative Aperture F/2.9 | |
|---|---|---|---|---|
| Radius | Thickness or Air Separation | Refractive Index $n_D$ | Abbé V number | Relative Partial Dispersion |
| $R_1+.4802$ | $D_1$ .0556 | 1.613 | 59.3 | .999 |
| $R_2-3.091$ | $D_2$ .0185 | 1.4388 | 57.8 | .909 |
| $R_3+.2633$ | $D_3$ .0649 | 1.613 | 57.6 | 1.005 |
| $R_4+1.798$ | $S_1$ .0742 | | | |
| $R_5-.8134$ | $D_4$ .0232 | 1.652 | 33.5 | 1.060 |
| $R_6+.3490$ | $S_2$ .1002 | | | |
| $R_7+1.124$ | $D_5$ .0556 | 1.613 | 55.7 | 1.010 |
| $R_8-.5224$ | | | | |

In which $R_1$, $R_2$ ... represent the radii of curvature of the individual lens surfaces counting from the front (that is the side of the longer conjugate), the positive sign indicating that the surface is convex to the front and the negative sign that it is concave thereto, $D_1$, $D_2$ ... represent the axial thicknesses of the individual lens elements, and $S_1$, $S_2$ represent the axial lengths of the airgaps between the components.

ARTHUR WARMISHAM.
CHARLES GORRIE WYNNE.

REFERENCES CITED

The following references are of record in the file of this patent:

UNITED STATES PATENTS

| Number | Name | Date |
|---|---|---|
| 1,588,612 | Richter | June 15, 1926 |
| 1,122,895 | Florian | Dec. 29, 1914 |
| 1,697,670 | Wandersleb et al. | Jan. 1, 1929 |
| 2,085,437 | Michelssen | June 29, 1937 |
| 1,541,407 | Spannenberg | June 9, 1925 |
| 535,897 | Goerz et al. | Mar. 19, 1895 |
| 1,025,766 | Straubel | May 7, 1912 |
| 1,713,708 | Merte | May 21, 1929 |
| 576,896 | Rudolph | Feb. 9, 1897 |

OTHER REFERENCES

Partington, "Textbook of Inorganic Chemistry," 1937 5th ed., pages 882–883.

Hackh, "Hackh's Chemical Dictionary," 2nd ed., 1937, page 42, article on "Alum."

Handbook of Chemistry and Physics, 1926, by Hodgman and Lange, page 723.